Aug. 25, 1936.  A. L. STOWELL  2,052,259
COILABLE MEASURING DEVICE
Filed Sept. 2, 1932
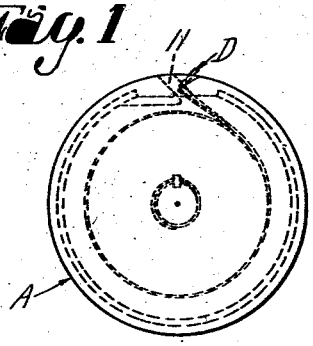
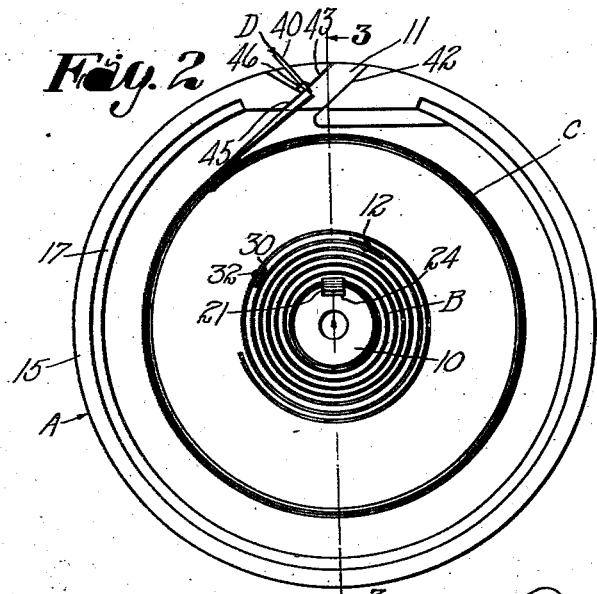
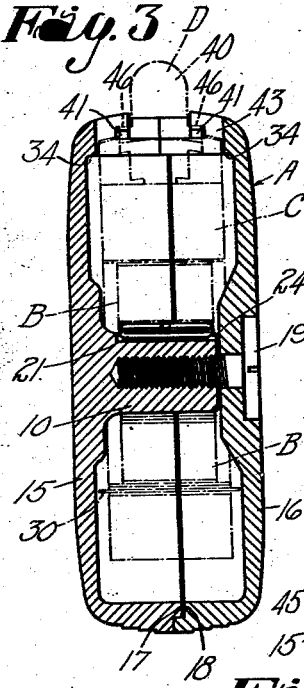
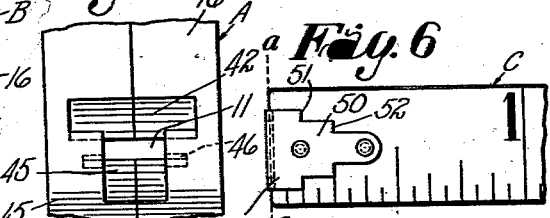
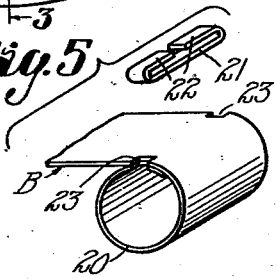
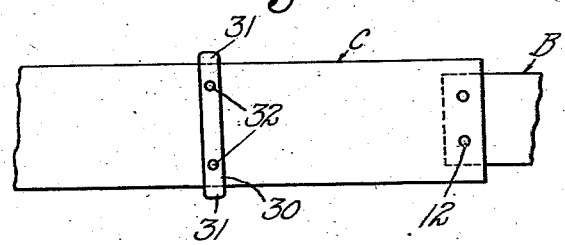
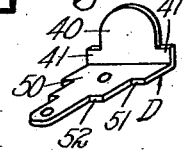
Inventor
Austin L. Stowell Patented Aug. 25, 1936

2,052,259

UNITED STATES PATENT OFFICE 2,052,259

COILABLE MEASURING DEVICE

Austin L. Stowell, New Britain, Conn., assignor to The Stanley Works, New Britain, Conn., a corporation of Connecticut Application September 2, 1932, Serial No. 631,527

9 Claims. (Cl. 33—138)

This invention relates generally to measuring tapes of the type which includes a steel tape adapted to be coiled within a suitable holder or casing. The improvements find particular application in connection with a tape having a bent transverse form, such as a concavo-convex form, so that the tape has an inherent tendency to assume a rectilinear state.

The aim of the invention is to provide a measuring device of this type having various features of novelty and advantage which make it more simple and economical in construction and more convenient in use.

More particularly, an aim of the invention is to provide a measuring device in which the winding strip or blade is securely and economically anchored to the central stud of the casing; in which the hook or clip on the outer or free end of the measuring tape may be effectively locked to the casing when the tape is completely wound in order to prevent accidental withdrawal of the tape from the casing; in which the attaching portion of the hook is so constructed and correlated with the measuring tape that certain of the graduations adjacent the free end of the hook are emphasized and may be more easily read; in which the finger or ear of the hook, which extends at right angles from the general plane of the free end of the tape, is so associated with the tape that either inside or outside measurements may be taken without introducing appreciable errors; and in which provision is made whereby the winding strip or blade may be readily adjusted and the extent to which the tape is withdrawn from the casing is limited.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing:

Figure 1 is a side view of a measuring device in which the improvements of the present invention are incorporated;

Fig. 2 is a view similar to Fig. 1 with the device reversed and one side of the casing removed;

Fig. 3 is a transverse sectional view taken substantially on line 3—3 of Fig. 2;

Fig. 4 is a perspective view showing the inner rolled end of the winding strip;

Fig. 5 is a view similar to Fig. 4 showing the parts before the clip is attached;

Fig. 6 is an elevational view of one end of the measuring strip with the attaching portion of the hook secured thereto;

Fig. 7 is a view showing the outer end of the winding strip and the inner end of the measuring strip;

Fig. 8 is a detail view showing another arrangement for securing the inner end of the winding strip to the central stud or post;

Fig. 9 is an edge view of that portion of the casing which is provided with the entrance slot for the measuring strip or tape; and Fig. 10 is a perspective view of the hook.

Referring to the drawing in detail, A denotes, generally, a casing or holder of flat cylindrical form, the same having a centrally disposed post 10 and an entrance slot 11 in its peripheral wall. The letter B designates the winding or tensioning device which is here shown as being in the form of a coiled resilient strip, the inner end of which is anchored, as hereinafter described more in detail, to the post 10. The letter C designates the measuring strip or tape which may comprise a strip of resilient metal having a concavo-convex form so that, when extended, it will automatically assume a rectilinear state or straight rod-like form. The inner end of this tape is secured to the outer end of the winding strip B as by means of rivets 12. The outer end of the measuring strip carries a hook D. The tendency of the measuring strip is to unwind and, preferably, the tension of the winding strip is only such as to approximately balance the resistance of friction and the tendency of the measuring strip to resist winding. With this arrangement, the measuring strip is adapted to be pulled out of and pushed into the casing and will be retained in any position of adjustment. It is understood, however, that, so far as certain features of the invention are concerned, the winding instrumentality may comprise a coiled spring having sufficient tension to overcome the resistance of friction and the resistance of the measuring tape to bend. In such case, when the measuring strip is released, it is immediately and automatically re-wound into a coil.

In accordance with the present invention, the casing or holder A comprises two generally round, cup-shaped parts 15 and 16 each molded from a plastic material, such as cellulose acetate. There is a rabbeted joint between the flanges of these two parts, this joint being formed by a rib 17 on the part 15 and a groove 18 in the other part adapted to receive the rib. The rabbeted joint is interrupted adjacent the entrance slot 11 so that the two parts are held against relative rotation. Molded integrally with one of the parts of the casing, in the present instance the part 15, is the centrally located stud or post 10 having a threaded axial recess adapted to receive the threaded stem of a screw 19 whereby the two parts of the casing are held together. By providing a two-part casing of molded material, economy in manufacture is had, and a device of extremely pleasing appearance is produced. Since the central stud is molded integrally with one part of the casing, the expense attendant to providing a separate stud and securing the stud in place is avoided.

Referring now to my improved arrangement for anchoring the inner end of the winding strip to the stud, this end of the strip is provided with an integral cylinder 20 formed by rolling or curling the strip back upon itself. Provided on the inside of this cylinder is a key or spline 21 which, in the embodiment shown in Figs. 4 and 5, may comprise the central portion of a clip formed of a strip of metal, the ends 22 of which are bent over and towards each other. The double wall of the cylinder is notched, as at 23, so as to accommodate the ends of the clip. The cylinder is adapted to be slipped over the cylinder or post 10, and the key 21 engages in a longitudinally extending groove 24 in the periphery of the stud. This arrangement is a very simple one and is characterized by its economy in manufacture and the ease and facility with which the parts may be assembled. In the embodiment shown in Fig. 8, the key or spline is in the form of a bar 21' secured in place by rivets 25 which also hold the cylinder 20 anchored to stud 10.

There is provided, adjacent the inner end of the measuring tape or strip, a stop member adapted to cooperate with suitable shoulders on the casing for limiting the extent to which the measuring tape may be withdrawn from the casing. In the present instance, this stop is in the form of a transverse bar 30 having its ends 31 extending beyond the side edges of the measuring strip. The bar may be secured by rivets 32. As shown in Fig. 3, the casing has, at opposite ends of the entrance slot 11, internal shoulders 34 against which the projecting ends of the stop member 30 are adapted to engage. With this arrangement, when it is found necessary or desirable to adjust the tension of the winding strip so that the tension of that strip will be just sufficient to counterbalance the friction of the several parts and the resistance of the concavo-convex measuring strip against bending, one or more coils may be added to or subtracted from (as the exigencies of the case may demand) the winding strip. This is done by removing the part 16 of the casing, pulling out the measuring strip to the full extent, withdrawing the outer end of the winding strip laterally from the casing, subtracting or adding one or more turns to the winding strip, moving the stop back into the casing, and finally assembling the two parts of the casing. This adjustment of the winding strip may be readily made at the manufacturing plant or it may be made by the user without requirement of any particular skill.

In order to interlock the hook D with the casing when the measuring strip is completely wound up, and thus prevent the hook from accidentally catching on an object or edge and causing injury to the measuring strip, the following arrangement is provided. The hook D has a finger or ear 40 disposed at right angles to the plane of the free end of the measuring strip and adapted to serve as an abutment for engagement with objects to be measured. This finger has, at its base and at each side, lugs 41 which project above the plane of the measuring strip. The entrance slot 11 in the peripheral wall of the casing is inwardly and rearwardly inclined and has a front wall 42 and a rear wall 43. Leading rearwardly from the entrance slot is a recess of a width just sufficient to accommodate the ear 40 above the lugs 41. The bottom 45 of this recess is inclined inwardly and forwardly so that, when the measuring strip is entirely wound up, as shown in Fig. 2, the ear 40 may lie closely to this bottom wall. The rear wall 43 of the slot 11 has, to either side of the recess and immediately above the inner end of the bottom wall 45 of the recess, notches 46 adapted to receive the lugs 41. With this arrangement, when the measuring strip is completely wound up, the lugs 41 engage in the notches 46, and the ear 40 extends through the recess. The tendency of the free end of the measuring tape is to spring outwardly so that the resiliency of this tape holds the lugs 41 in the notches 46. When it is desired to unwind the measuring strip, the tongue or ear 40 is pressed inwardly so as to disengage the lugs 41 from the notches and then pressure is exerted on the rear face of the tongue so as to draw out the strip. As the winding up operation of the tape is completed, the tongue is forced back into the recess and when the lugs come into registry with the notches 46, the resiliency of the tape will engage those lugs in the notches.

Furthermore, in accordance with the present invention, the attaching portion or tang 50 of the hook D is so constructed and arranged as to provide shoulders or abutments which are in registry with certain scale marks adjacent the free end of the tape so as to facilitate the taking of readings. As shown in Fig. 6, this tang is stepped so as to provide shoulders 51 and 52 which are in registry with the first one-eighth and one-quarter marks on the scale. These shoulders are readily discernible and emphasize, so to speak, the scale marks with which they are in registry.

It has been the usual practice to position the finger or ear 40 of the hook so that either the front or forward face or the rear face is in the plane of the free end edge of the measuring tape. When the forward face of the hook and the end edge of the tape are in the same plane, inside readings may be taken by abutting the front face of the ear against the surface between which and another point measurements are to be taken without the introduction of any errors, but outside measurements cannot be taken without introducing considerable error. When the rear face of the hook and the end edge of the tape are in the same plane, correct outside readings may be taken, but inside measurements would be incorrect to the extent equal to the gauge or thickness of the tongue. In accordance with the present invention, and in order to make the device more adaptable for either inside or outside readings, without introducing appreciable error in either case, the finger or ear 40 is so positioned with respect to the end edge of the measuring that the central or medial plane of the ear includes the end edge of the tape. As shown most clearly in Fig. 6, the medial plane of the finger or ear is designated by the line a—a, and which line corresponds with the end edge of the measuring tape. With this arrangement, the error is split, so to speak. While there is a slight error when either inside or outside measurements are taken, this error is rather negligible.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a coilable measuring device, a casing comprising two complementary cup-shaped members formed of a plastic moldable material, one of said members having formed integrally therewith a centrally located stud provided with a longitudinal groove, a winding strip having a cylindrical portion at its inner end adapted to receive said stud, a key within said cylindrical portion engaging in said groove, and a measuring strip operatively connected to the outer end of said winding strip.

2. In a coilable measuring device, a casing provided with a stud therein, said stud having a keyway, a measuring tape, a winding strip operatively connected at its outer end to said tape, said winding strip having its inner end curled to form an integral cylinder, and means for securing said cylinder against uncurling, said last mentioned means including a key engaging in said keyway for preventing rotation between the cylinder and the stud.

3. In a coilable measuring device, a casing provided with a stud having a longitudinal groove, a measuring tape, a winding strip operatively connected at its outer end to said tape, the inner end of said winding strip being rolled to form an integral cylinder adapted to receive said stud, and a clip for holding the rolled end of said strip in cylindrical form, said clip constituting a key adapted to engage in said groove.

4. In a coilable measuring device, a casing having an entrance slot, a resilient measuring tape adapted to be coiled within said casing and to pass through said slot, said tape by reason of its resiliency having a tendency to uncoil itself from said casing, said casing having at one edge of said slot a centrally disposed recess and a notch to each side of said recess, and a hook on the free end of said tape having a finger adapted to be accommodated by said recess, said hook being provided with shoulders adapted to respectively engage in said notches to releasably lock said tape in said casing.

5. In a coilable measuring device, a casing having an entrance slot, a measuring tape adapted to be coiled within the casing and to pass through said slot, said tape being resilient and adapted to assume a rectilinear state when withdrawn from the casing, a winding strip coiled within the casing, a stud axially of the casing provided with a keyway, said winding strip having the inner end coiled into a cylinder engaging about said stud, a key engaging in said keyway and maintaining said inner end in cylindrical form, the outer end of said winding strip being directly connected to the inner end of said measuring tape, a stop on said casing adjacent said entrance slot, and a stop adjacent the inner end of said measuring tape and adapted to engage said first mentioned stop to limit the extent to which said measuring tape is withdrawn from the casing.

6. In a coilable measuring device, a casing having an entrance slot, a measuring tape adapted to be coiled within the casing and to pass through said slot, said tape being resilient and adapted to assume a rectilinear state when withdrawn from the casing, a winding strip coiled within the casing, a stud axially of the casing provided with a keyway, said winding strip having the inner end coiled into a cylinder engaging about said stud, a key engaging in said keyway and maintaining said inner end in cylindrical form, the outer end of said winding strip being directly connected to the inner end of said measuring strip, said casing having an internal shoulder at each end of the entrance slot, and a transverse bar fixed to the inner end of said measuring tape and having its ends adapted to engage said shoulders.

7. In combination, a measuring strip having scale graduations along one side, and a hook connected to the end of said strip, said hook having an attaching portion and a finger extending at right angles therefrom, said attaching portion having shoulders respectively registering with certain graduation marks of said scale whereby to emphasize said scale marks and facilitate reading thereof.

8. In combination, a measuring strip having scale graduations along one side, and a hook connected to the end of said strip, said hook having a finger extending at an angle to the plane of the strip and an attaching portion extending longitudinally of the strip, said attaching portion being stepped down in width from the outer end of the strip whereby to provide a plurality of shoulders respectively alined with certain scale graduations on the strip.

9. In a coilable measuring device, a casing having an entrance slot, a recess interconnected with said slot, a resilient measuring tape adapted to be coiled within the casing and to pass through the slot, said tape by reason of its resiliency having a tendency to uncoil itself from said casing, a hook on the free end of said tape having a laterally projecting finger adapted to be accommodated by said recess, said recess having opposed notches, and lugs integral with the hook adapted to engage in said notches to releasably lock said tape in said casing.

AUSTIN L. STOWELL.